(12) United States Patent
Jerschl et al.

(10) Patent No.: US 12,181,067 B2
(45) Date of Patent: Dec. 31, 2024

(54) ARMATURE FOR AN ELECTRO-MECHANICAL VALVE, VALVE HAVING THE ARMATURE AND MANUFACTURING METHOD FOR THE ARMATURE

(71) Applicant: RAPA Automotive GmbH & Co. KG, Selb (DE)

(72) Inventors: Martin Jerschl, Selb (DE); Olaf Seewald, Selb (DE)

(73) Assignee: RAPA Automotive GmbH & Co. KG, Seib (DE)

( * ) Notice: Subject to any disclaimer, the term of this patent is extended or adjusted under 35 U.S.C. 154(b) by 34 days.

(21) Appl. No.: 18/332,151

(22) Filed: Jun. 9, 2023

(65) Prior Publication Data

US 2023/0400116 A1    Dec. 14, 2023

(30) Foreign Application Priority Data

Jun. 10, 2022  (DE) .......................... 102022114731.2

(51) Int. Cl.
*F16K 31/06* (2006.01)
*F16K 27/02* (2006.01)

(52) U.S. Cl.
CPC ........ *F16K 31/0658* (2013.01); *F16K 27/029* (2013.01); *F16K 31/0606* (2013.01);
(Continued)

(58) Field of Classification Search
CPC ............. F16K 31/0655; F16K 31/0693; F16K 31/0627; F16K 27/029
See application file for complete search history.

(56) References Cited

U.S. PATENT DOCUMENTS 2,819,432 A * 1/1958 Ray ...................... F16K 31/0655
251/129.01
4,834,337 A * 5/1989 Chorkey ............. F16K 31/0655
251/360
(Continued)

FOREIGN PATENT DOCUMENTS

| CN | 2918793 Y | 7/2007 |
|---|---|---|
| DE | 19754525 C1 | 4/1999 |
| DE | 102004021290 A1 | 3/2005 |

OTHER PUBLICATIONS

Office Action issued on Mar. 3, 2023, in corresponding German Application No. 102022114731.2, 12 pages.

*Primary Examiner* — Umashankar Venkatesan
(74) *Attorney, Agent, or Firm* — Maier & Maier, PLLC (57) ABSTRACT

A armature assembly for an electromagnetically actuatable 2/2 or 3/2 way valve with a tube-shaped armature outer part of a ferromagnetic material with a longitudinal axis and an armature inner part from a material with a lower density than the ferromagnetic material. The armature inner part being axially inserted in a mounting end of the armature outer part. Between the armature outer part) and the inserted armature inner part there is formed at least one axial through flow duct through the armature assembly, an axial hollow cylinder-shaped recess is formed for receiving a cylindrical spring; and a bottom) of the recess is formed by the armature inner part and/or the armature outer part as a support for an end of the spring.

15 Claims, 6 Drawing Sheets

(52) U.S. Cl.
CPC ...... *F16K 31/0627* (2013.01); *F16K 31/0655* (2013.01); *F16K 31/0693* (2013.01)

(56) References Cited

U.S. PATENT DOCUMENTS

| | | | | | |
|---|---|---|---|---|---|
| 5,246,199 | A | * | 9/1993 | Numoto | F16K 31/0658 251/129.15 |
| 6,712,333 | B2 | * | 3/2004 | Rovira | F16K 31/0689 251/77 |
| 7,128,089 | B2 | * | 10/2006 | Bente | F16K 31/0655 251/83 |
| 9,541,213 | B2 | * | 1/2017 | Zieger | F16K 1/34 |
| 10,753,498 | B2 | * | 8/2020 | Landacre | B67D 1/1272 |
| 2005/0269538 | A1 | | 12/2005 | Haynes et al. | |
| 2023/0335323 | A1 | * | 10/2023 | Guldenschuh | H01F 7/088 |

* cited by examiner

ARMATURE FOR AN ELECTRO-MECHANICAL VALVE, VALVE HAVING THE ARMATURE AND MANUFACTURING METHOD FOR THE ARMATURE

TECHNICAL FIELD

The present disclosure generally relates to electromagnetically actuatable valves. In particular, the present disclosure relates to an improved armature assembly for a way valve to be actuated electromagnetically.

BACKGROUND

The following background information on the present disclosure is intended to permit a better understanding of the relations described hereinafter and represent prior art only to the extent of the actual content of a document stated here and publicly available at the time of filing.

Valves are important elements both in hydraulic and in pneumatic systems. A valve can be used as an actuator for controlling a pressure flow, for example a pneumatic air flow. For example, it is the task of a valve as a way valve to release or to lock the way or ways for a pressure flow or to change the flow direction of the pressure flow. Way valves can be subdivided according to various criteria: (1) In accordance with the valve's structure into piston-slide valves and seat valves; (2) in accordance with the actuation of the valve into mechanically, manually, pneumatically, electromagnetically or electro-pneumatically actuated way valves; (3) in accordance with the number of stable positions of the valve into mono-stable (one stable position with return through spring force) or bi-stable (two stable positions) valves or three- or multi-position valves; (4) in accordance with the switch position of the valve in the basic position, wherein in the case of 2/2 and 3/2 way valves a distinction is made as to whether the valve is open in the basic position ("normally open"-"NO") or closed ("normally closed"—"NC"), and in the case of 3/3, 4/3 and 5/3 way valves a distinction is made as to whether the valve is open, closed or vented in the middle position; and (5) in accordance with the number of connectors and positions of the valve into 2/2-, 3/2-, 3/3-, 4/2-, 5/2-, 4/3- or 5/3 way valves (for example, a 3/2 way valve has three connectors and two switching positions).

DE 10 063 710 A1 shows a mono-stable electromagnetically actuatable 2/2 way valve. DE 27 57 803 A1 shows a mono-stable electromagnetically actuatable 3/2 way valve.

Figure 1:
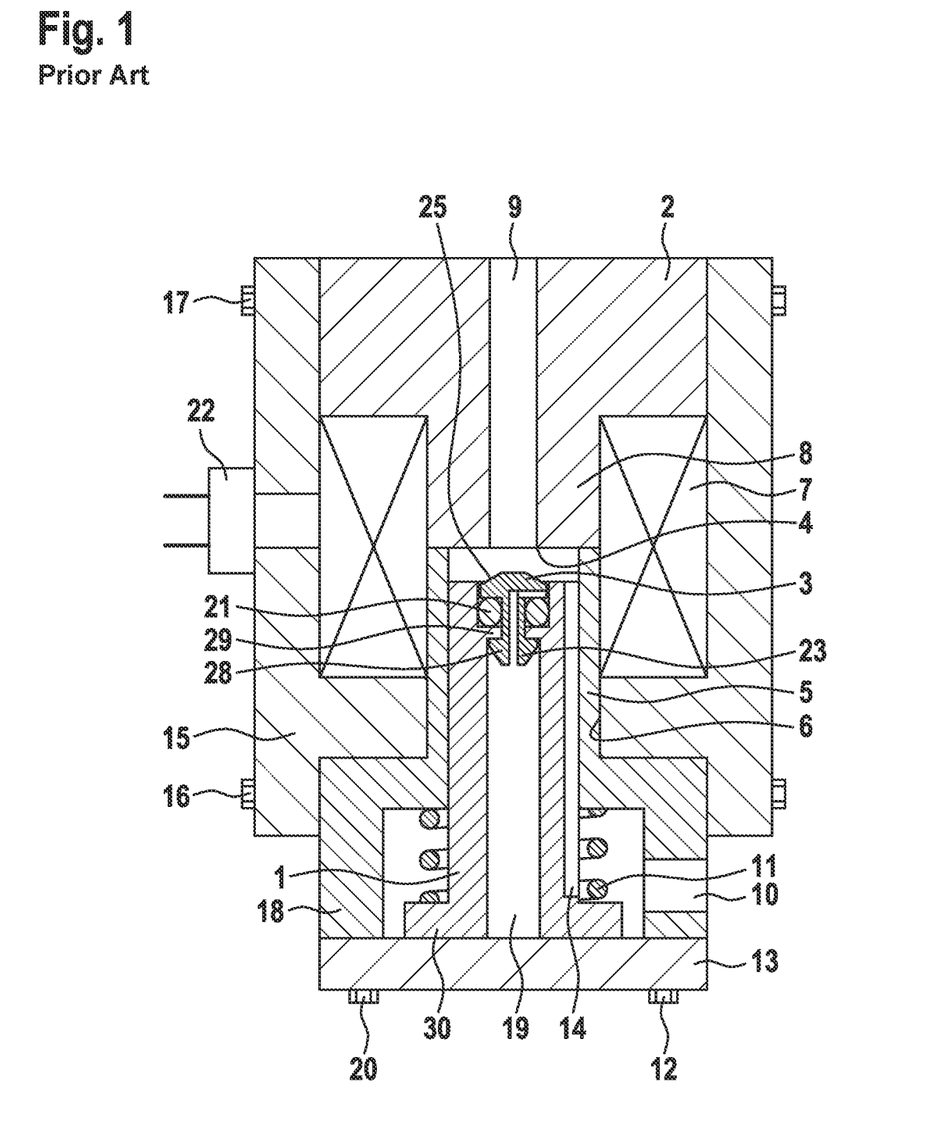
FIG. 1 an NO 2/2 valve of the prior art.

FIG. 1 shows, as an example, the valve device known from DE 10 063 710 A1 with a mono-stable NO 2/2 way valve, i.e. according to the above nomenclature a mono-stable valve with two connectors and two switching positions (open/closed), which is open in the stable basic position. The valve device of FIG. 1 has a valve housing of several housing parts 2, 13, 15, 18, which are interconnected by screws 12, 20, 16, 17. The valve housing has a pressurizing medium duct 10 as a pressurizing medium feed and a pressurizing medium duct 9 as a pressurizing medium discharge. For locking the pressurizing medium flow through the valve device, a valve is provided with a valve seat 4 and a valve closing member 3 that can be moved towards or away from said seat. The valve seat 4 is formed by the end of the pressurizing medium duct 9 disposed in the valve housing. Into a housing recess 6 arranged in the housing part 15 coaxially to the valve seat 4 there extends a tube-shaped part of the housing part 18 for guiding a ferromagnetic armature 1 movable therein as an actuation element for the valve. The armature 1 as a movable part of an electromagnet arrangement can be moved toward the valve seat 4 or away therefrom. The armature 1 has a recess 19 which extends in the direction of the longitudinal axis of the armature 1. On its end facing away from the valve seat 4, the armature 1 has a radially outwardly extending collar 30. In the housing part 18 a spring 11 is arranged on the outside around the armature 1, wherein one end of the spring 11 contacts a wall of the housing part 18 and the other end of the spring 11 contacts the collar 30 of the armature 1. In the outer side of the armature 1 there extends a pressurizing medium duct 14 through which, in the open state of the valve, a pressurizing medium can flow from the pressurizing medium feed to the pressurizing medium discharge. In the end region of the recess 19 of the armature 1 facing the valve seat 4, the valve closing member 3 is attached, wherein a damping element 21 is arranged between the side of the valve closing member 3 facing away from the valve seat 4 and a ring-shaped projection 29 in the recess 19 of the armature 1. The electromagnet arrangement has, in addition to the armature 1, a core 8 formed by a section of the housing part 2, an electrically energizable coil 7 and a yoke formed by the housing part 15. For energizing the coil 7, a connection element 22 electrically connected to the coil 7 is disposed on the housing part 15. The coil 7 is arranged immovably with reference to the valve housing and surrounds the core 8 and the tube-shaped part 5 of the housing part 18. Upon energization, the coil 7 in connection with the yoke and the core 8 causes a magnetic force, by which the armature 1 is pulled in the direction of the core 8, so that the armature 1 can be moved with the valve closing member 3 from the stable basic position into a second position, in which the armature 1 locks the pressurizing medium duct 9 of the valve. After turning off the current through the coil 7, the armature 1 is returned to the basic position by means of the spring force of the spring 11, so that the pressurizing medium duct 9 is open again.

In the valves of the above-stated prior art, comprehensive constructive changes are required for forming variants of the valve function, i.e. a reconfiguration from a 3/2 to a 2/2 way valve and vice versa, said changes being connected to numerous changes in components and thus corresponding costs.

SUMMARY

It is an object of the present disclosure to propose an electromagnetically actuatable valve device, the structure of which permits a cost-effective formation of variants or in which the constructive effort for forming variants is reduced.

For example, an improved structure of the valve device in comparison to the above-stated prior art would be desirable, which makes possible a simple configuration of the valve device as a 2/2 way valve or as a 3/2 way valve without comprehensive changes to the overall structure of the valve device—if possible, without sacrificing any given advantages.

Advantages or explanations in the context of the armature assembly proposed here as solution are applicable likewise to the associated manufacturing method and the valve device having the armature assembly and vice versa.

A first aspect of the present disclosure provides an armature assembly for an electromagnetically actuatable way valve device. The armature assembly has: a tube-shaped armature outer part of a ferromagnetic material with a longitudinal axis and an armature inner part axially inserted in a mounting end of the armature outer part, said armature inner part being made of a material with a ferromagnetically lower density than the ferromagnetic material, preferably this can be a non-ferromagnetic or non-magnetic material. Between the ferromagnetic armature outer part and the inserted armature inner part, there are formed at least one through flow duct, which leads axially through the armature assembly, and a hollow cylinder-shaped recess, which is coaxial to the armature assembly. The recess is open and intended for retaining a cylindrical spring on the end of the armature inner part opposite the mounting end of the armature outer part. A bottom on the inside of the recess is formed from the armature inner part and/or the armature outer part as a support for a spring end of the spring disposed on the inside of the recess.

The recess for the spring can be formed by a ring-cylindrical recess extending coaxially to the longitudinal axis of the armature outer part in the inner surface of the armature outer part, or by a cylindrical recess extending coaxially to the longitudinal axis of the armature inner part in the outer surface of the armature inner part, or by both together.

The central idea of the solution proposed here is the novel armature assembly with substantially the bipartite structure in such a manner that the electromagnetic functionality, i.e. the conducting of the magnetic flow to produce the magnetic actuation force required for the valve function, on the one hand, and the mechanical functionality, i.e. the mechanical connection of the armature assembly to the periphery, on the other hand, is implemented separately in two main components of the armature assembly, namely in a ferromagnetic armature outer part (armature mantle) and an armature inner part (armature inlay or armature insert), which can be manufactured from a material with lower density and thus lower weight than would be the case if it were likewise manufactured from a ferromagnetic material. The material for the armature inner part can be, in particular, a non-ferromagnetic or a non-magnetic material.

For the functionality of the conduction of the magnetic flow in the magnetic circuit in the armature assembly, a ferromagnetic material and thus a material with comparatively high density and correspondingly high weight is necessary. By the separation of the functionalities of the armature assembly proposed here, the armature assembly can be optimized with respect to weight. This is achieved on the one hand in that it is possible to employ a material with lower density and thus smaller weight for the armature inner part (armature inlay), which does not have to contribute to the magnetic flow. For the armature outer part (armature mantle), which guides the magnetic flow during operation, and which is necessary for producing the magnetic force necessary for moving the armature assembly, a suitable ferromagnetic material is employed. Since the magnetically conductive armature outer part is responsible only for producing the magnetic force for moving the armature assembly, the armature outer part can be reduced with respect to its dimensions, in particular its material thickness, to the extent permitted by the magnetic flow occurring during operation. This means that only the region of the armature assembly required for the magnetic flow must be made from a magnetically conductive material. This permits to configure the armature assembly in a weight-optimal manner.

With regard to the dimensioning of the wall thickness of the armature outer part it should be noted that the armature assembly does not simply have an axial through flow duct, but that the magnetically effective armature outer part, in particular its radially measured wall thickness, is the result of optimization considerations. Fundamentally, the adjusted or selected wall thickness has an influence on the magnetic flow guided by the armature outer part during operation of the valve, and thus on the magnetic force exercisable with the armature outer part during valve actuation. On the other hand, the wall thickness of the armature outer part of a ferromagnetic material substantially determines the weight of the armature assembly to be moved upon actuation of the valve, and thus the dynamic properties of the valve in operation. Thus, the wall thickness can be adjusted and optimized in targeted manner in dependence on requirements in a certain field. Thus, the armature outer part proposed here differs clearly from a mere axial bore in a conventional armature, wherein the bore there is not adjusted in accordance with corresponding considerations with regard to the resulting wall thickness of the conventional armature with a bore.

For example, the wall thickness can be adjusted with regard to the magnetic force necessary during operation of the valve for a necessary closure holding pressure or the force necessary for opening the valve. Possibly, further parameters, such as the through flow when the valve is open, the spring force (to be overcome during operation), the sealing area, etc., can be considered.

A lower limit for the wall thickness of the armature outer part is that the flow-guiding cross section of the armature outer part should not throttle the magnetic flow during operation of the valve.

The above considerations are not only dependent on the wall thickness of the armature outer part, but also on the material selected for the armature outer part. As soon as a ferromagnetic material has been chosen, the wall thickness can be determined in line with the target set.

Moreover, it can be required to also consider the magnetic flow in the "yoke" of the electromagnet arrangement, i.e. in the so-called well or bracket.

With regard to the weight of the armature assembly proposed here, it should be noted that a high dynamic is desired for the valve, i.e. if the valve is intended to be able to switch fast, this can be achieved in particular by the armature assembly proposed here by means of reducing the cross section of the armature outer part guiding the magnetic flow and thus the wall thickness of the armature outer part.

Summarizing, it has to be established that the wall thickness can be optimized in line with, for example, any of the above-stated requirements. In the context of the armature assembly proposed here it is particularly important that on the basis of the multi-part structure, optimization for the respective objective is possible in a greater range than in the case of a conventional armature, which, in single-part manner, consist of one single material.

It is particularly preferred when, with the solution proposed here concerning changes of the geometry of the armature outer part, i.e. the wall thickness, a desired optimization can be implemented, while the interface between the armature outer part (mantle) and the armature inner part (inlay) is not changed, since this allows for the armature inner part as a tool-bound injection-molded part to remain unchanged, and for only the armature outer part as a turned part to be changed.

The magnetically effective armature outer part can be manufactured from a ferromagnetic material in a production-technically simple geometry, preferably in a cylinder shape. Thereby, the magnetic circuit on the one hand and the weight of the armature assembly on the other hand is optimized by employing a material with high density only for the magnetically effective armature outer part. The thus achieved weight reduction in relation to a conventional armature allows for achieving considerably faster switching times, since the armature assembly proposed here is substantially lighter than a conventional armature, which consists of a ferromagnetic material monolithically as a solid body. This also permits employing the concept for a proportional function in the valve, wherein a high dynamic is required.

The non-magnetic component of the armature assembly, i.e. the armature inner part as the armature inlay, independently of the magnetically conductive part, i.e. the armature outer part as the armature mantle, serves for mechanically receiving and coupling to a return spring for transferring the mechanical spring force, for receiving front-side elastomers as sealing elements and/or damping elements and for supplying at least one through flow duct for guiding the flow through the armature assembly. Since the armature inner part is decoupled from the magnetically relevant armature outer part with regard to the functionality of guiding the magnetic flow in the magnetic circuit, fundamentally any suitable material can be applied. A plastic material can be employed with a lower density in comparison to the ferromagnetic material of the armature outer part, so that the armature assembly overall has less weight. For example, the armature inner part can be manufactured as an injection-molded plastic part, which permits implementing shapes and geometries of any desired complexity in a production-technically simple manner, while at the same time elastic elements can be injection-molded or vulcanized onto the front sides.

The multi-part implementation of the armature assembly permits receiving a spring, preferably a cylindrical pressure spring, with great construction length. This is achieved by the pressure spring being supported on a stop on the armature inner part. The armature inner part together with the armature outer part at the same time form a guide for the spring, so that the spring is secured against buckling during operation of the valve device. Through the thus achieved good guiding of the spring, a great bandwidth of spring forces can be realized in spite of the limited construction space, and the valve device can be adapted easily to different requirements, such as sealing pressures.

After fabricating the geometrically simple armature outer part as the armature mantle from a ferromagnetic material and manufacturing the armature inner part as the armature inlay for the armature mantle, the armature inlay can be inserted into the armature mantle up to the stop and permanently mechanically fixed by folding, bending or caulking of material of the armature mantle at the insertion end over the armature inner part. After mounting the armature inner part in the armature outer part the two firmly interconnected components form the armature assembly.

It is particularly advantageous that a variant formation between a 3/2 and a 2/2 way valve does not require changes to the armature assembly. This means that the armature assembly proposed here can be installed identically in both 2/2 and 3/2 way valves. The formation of variants takes place merely by a correspondingly adapted pole part of the valve device. In production, thus the variant formation from a 2/2 to a 3/2 way valve can be implemented without changing the structure of the armature assembly, by merely having to make available two different pole parts.

In the following, further details of the armature assembly according to the first aspect will be explained.

The armature inner part can have at one attachment end a radially protruding edge that extends in the circumferential direction orthogonally to the longitudinal axis. In the edge, a recess can be provided that corresponds to the at least one through flow duct. This recess can have substantially the same cross-sectional shape as the through flow duct or can deviate therefrom, for example can be executed as a through hole. The tube-shaped armature outer part is executed on its inside such that it has an inner contour that is complementary to the outer contour of a rotation body defined by rotating the armature inner part around the longitudinal axis. The armature inner part can then be inserted into the mounting end of the armature outer part similar to a cartridge into a cartridge chamber. The protruding surface of the edge directed in the direction of the longitudinal axis (with reference to the armature inner part toward the inside) thus acts as an end stop for the inserted armature inner part and ensures an exact positioning of the armature inner part in the armature outer part.

The outer diameter of the edge of the armature inner part can be executed so as to decrease starting from the attachment end in the direction of the longitudinal axis. For example, the decrease of the outer diameter can extend in stepped manner or linearly or in a combination of both. This has the advantage that loads and stress occurring during operation in the material of the armature assembly can be prevented or at least reduced. For example, the edge can be executed with two or more steps, wherein the outer diameter of the edge then decreases along the longitudinal axis in two or more steps.

The at least one axial through flow duct can be configured, for example, in the shape of an axial groove, depression, recess or the like in the outer surface of the armature inner part. Preferably, the bottom of the groove, i.e. the bottom of the depression or recess, viewed in a cross section of the armature inner part which extends through the groove and contains the longitudinal axis of the armature inner part, extends at least partly deeper in the armature inner part than the inner diameter of the axial, hollow cylinder-shaped recess for receiving the cylindrical spring. Accordingly, the free cross section of the flow duct extends largely along the longitudinal axis below the spring, which is introduced in the recess of the armature assembly when employed as intended.

The end of the armature inner part opposite the attachment end can have an outer diameter which is substantially equal to the inner diameter of the axial hollow cylinder-shaped recess as the spring retainer. Accordingly, at the end of the armature inner part sufficient material is available for the integration of an elastic element described further below.

The armature inner part can be permanently fastened in the armature outer part by at least one of folding, bending and caulking of the material of the armature outer part in one or several places in the front side and/or at the edge of the mounting end of the armature outer part.

In the armature assembly several, preferably three, through flow ducts can be configured. The several through flow ducts can be arranged in evenly distributed manner with reference to the longitudinal axis of the armature inner part over the circumference of the armature inner part, by, for example, the through flow ducts being defined in the form of ring cylinder sectors over an angle range of 360°/(2n), wherein n is the number of through flow ducts. By such an even distribution of the flow cross section over the circumference of the armature inner part, it is possible to achieve a high efficiency cross section for the through flow duct and at the same time a great stability of the armature assembly.

The armature outer part is manufactured from a ferromagnetic material, which, in addition to the ferromagnetic property, can be selected in accordance with further requirements with reference to the pressurizing medium employed later during operation. In any case, the armature assembly proposed here does not require a particularly complex shape for the armature outer part; rather, the armature outer part as the armature mantle can be executed in the shape of a hollow cylinder and thus as a particularly simple geometric shape from the point of view of production technology. Such a hollow cylinder can be manufactured particularly easily, for example as a turned part by means of a machining method.

The armature outer part can be manufactured from a magnetically soft material, which is preferably selected from the group consisting of soft iron, steel with low carbon proportion, steel with added silicon (FeSi), nickel-iron alloys (FeNi), cobalt-iron alloys (FeCo), iron-aluminum alloys (e.g. FeAl, FeAlSi), ferrites or the like.

The armature inner part can be made of a hard plastic, which is preferably selected from the group consisting of high-density polyethylene, HDPE, polypropylene, PP, polymethyl methacrylate, PMMA, polyethylene terephthalate, PET, polyamide, PA, polycarbonate, PC, cellulose acetate, CS, and the like. In particular, materials on the basis of partly crystalline polyamide with partially aromatic proportions have proven suitable; for example, good results were achieved for the armature inner part with a material according to ISO 1874-PA 6T/61, MH, 12-140, GF40, for example Grivory®.

Into the axial front sides of the armature inner part respectively an elastic element can be integrated in injection-molded or vulcanized manner as a seal and/or damper. A multi-component injection-molding method is particularly suitable for this purpose, wherein the armature inner part is injection-molded from a hard plastic and at the same time the front-side seals and/or dampers are injection-molded thereon from an elastic material. The shape of the elastic elements can be respectively rotation-symmetric to the longitudinal axis of the armature inner part. With reference to the longitudinal axis of the armature inner part, the diameter of the elastic elements can be executed so as to become smaller respectively in the direction of the longitudinal axis toward the inside of the armature inner part. At least one of the elastic elements can be executed so as to project over the core material of the armature inner part at the associated end of the armature inner part.

The elastic elements can be made of an elastomer, which is selected from the group consisting of acrylonitrile-butadiene-styrene copolymer, ABS, acrylonitrile-butadiene-styrene rubber, EPDM, silicon, acrylonitrile-butadiene rubber, NBR or H-NBR, perfluoroelastomer, FFKM, fluororubber, FKM, polytetrafluoroethylene, PTFE, polethylene, PE, polystyrene, PS, and the like.

The following material combinations armature inner part/elastomer have proven to be particularly suitable: PP/PE, PMMA/PS, CA/ABS and PC/ABS.

With regard to the dimensions of the armature assembly there should be noted briefly: The armature inner part has a diameter in the range from 5 mm-15 mm at the broad end and a diameter in the range from 2.5 mm-7.5 mm at the narrow end and a length in the range from 10 mm-25 mm. At the interface to the armature inner part the armature outer part of course has the dimensions respectively matching the armature inner part. Moreover, the armature outer part has an outer diameter in the range from 7.5 mm to 15 mm and a length in the range from 14 mm-24 mm.

A second aspect of the present disclosure relates to an electromagnetically actuatable 2/2 or 3/2 way valve device with an armature assembly according to the first aspect as the actuation element for actuating the valve.

For a 2/2 way valve device, the electromagnetically actuatable way valve device substantially has the following components:

An electromagnet assembly consisting of an electrically energizable wire winding as a coil, a yoke, which girts the coil on the front sides respectively with a yoke front part and in the longitudinal direction with a yoke longitudinal part connecting the yoke front parts.

A guide tube into which the armature assembly is inserted.

A cylinder-shaped pole part, which is attached at one end of the guide tube, e.g. by welding, in a pressurizing medium-tight manner.

A (pressure) spring as a return spring, which is introduced in the hollow cylinder-shaped recess of the armature assembly and supported on the pole part on the inside of the guide tube.

A nozzle part with a first pressurizing medium connector and a second pressurizing medium connector, wherein the first pressurizing medium connector is connected to a first pressurizing medium duct extending coaxially to the guide tube and the second pressurizing medium connector is connected to a second pressurizing medium duct.

The end of the first pressurizing medium duct arranged on the inside of the guide tube forms a first valve seat and a first valve together with the first sealing element of the armature assembly caused to abut there by the spring.

The nozzle part is attached at the other end opposing the pole part, for example by folding or bending the edge of the guide tube around the nozzle part, and, together with the guide tube, defines a valve chamber, which is connected to the second pressurizing medium duct.

Recesses in the yoke front parts are oriented coaxially to a cylinder-shaped interior space defined by the coil and thus define a receiving space into which the pole part connected to the guide tube is inserted.

In the configuration described above, the first pressurizing medium duct and the second pressurizing medium duct can be selectively interconnected or mutually locked via the first valve by means of a movement of the armature assembly in the guide tube through energizing the coil.

In the 2/2 way valve device, the through flow duct between the armature outer part as the armature mantle and the armature inner part as the armature inlay causes pressure to be present on both sides of the armature assembly and that thus no pressure opening effect, but a pressure-supported sealing function takes place, on the condition that the working pressure is active at the second pressure medium duct. The pole part-side elastic element in this case serves as a damping element for end stop damping and thus noise damping.

For a variant formation of the 2/2 way valve device into a 3/2 way valve device, the above 2/2 way valve device is equipped with a developed pole part.

The developed pole part has a third pressurizing medium connector and, connected thereto and extending preferably coaxially to the guide tube, a third pressurizing medium duct, the end of which, arranged on the inside of the guide tube and arranged coaxially to the guide tube, forms a second valve seat and a second valve with the second sealing element of the armature assembly which can be caused to abut there. The third pressurizing medium duct can be locked via the second valve, by means of a movement of the armature assembly in the guide tube through energizing the coil, wherein the first pressurizing medium duct and the second pressurizing medium duct are then connected via the open first valve. In the resting position the second pressurizing medium duct and the third pressurizing medium duct are then interconnected via the at least one through flow duct of the armature assembly and the second valve.

In the 3/2 way valve device the through flow duct between the armature outer part as the armature mantle and the armature inner part as the armature inlay permits a through flow in the unenergized valve state between the second pressurizing medium connector and the third pressurizing medium connector. The pole part-side elastomer then serves primarily as a seal and at the same time as a damper, since the impact on the seat takes place in a manner damped by the elastomer.

Here, a further advantage of the novel armature assembly becomes apparent. For employment of the armature assembly in the 3/2 way valve device, the required seal seats are already present on both front sides of the armature assembly and the at least one through flow duct passes through the armature assembly as a flow path. The multi-part execution of the armature assembly permits the forming of this flow path in a simple manner by enabling the pressurizing medium to flow through between the armature mantle and the armature inlay.

As explained above, for a simple variant formation of the valve function, a way valve device can be easily configured as a 2/2 or a 3/2 way valve device with the armature assembly proposed here, since the configuration of the 2/2 way valve device into a 3/2 way valve device substantially requires only an additional bore in the pole part of the valve device for the third pressurizing medium duct or alternatively exchanging the pole part without pressurizing medium duct for a correspondingly configured pole part with pressurizing medium duct. This means that by the exception of the pole part, all parts of the 2/2 valve device can remain unchanged. The armature assembly at least is identical in both valve device variants.

A third aspect of the present disclosure relates to a manufacturing method for an armature assembly for an electromagnetically actuatable 2/2 or 3/2 way valve device according to the first aspect. The manufacturing method has the following steps:
a) Manufacturing the tube-shaped armature outer part from a ferromagnetic material with a longitudinal axis, for example by a machining turning method;
b) manufacturing the armature inner part from a material with a lower density than the ferromagnetic material, for example by injection molding;
c) inserting the armature inner part into the mounting end of the armature outer part;
d) fastening the inserted armature inner part by at least one of folding, bending and caulking of the material of the armature outer part in one or several places in the front side and/or at the edge of the mounting end of the armature outer part.

A rotation-symmetric inner contour of the armature outer part and the armature inner part are configured such in the respective manufacturing step that by the insertion step c) between the armature outer part and the inserted armature inner part there are formed at least one axial through flow duct through the armature assembly and an axial hollow cylinder-shaped recess for retaining a cylindrical spring, wherein further a bottom of the recess is formed by the armature inner part as a support for an end of a spring.

The armature outer part necessary for the magnetic circuit as the magnetically conducting function can be manufactured in geometrically simple manner as a hollow cylinder and can therefore be manufactured easily and cost-effectively in comparison to more complex geometries. Since the armature outer part is substantially a geometrically simple hollow cylinder, the required mechanical processing effort is small, which also permits using less readily machinable materials, if their use is advantageous. Thus, for example the use of stainless steel or of steels with particular magnetic properties (such as RFe material) is considerably facilitated.

The more complex contours required for forming the at least one flow duct and for the fitting for the spring can be implemented in the manufacture of the armature inner part, which can be manufactured in tool-bound manner and thus cost-effectively as an injection-molded plastic part. For example, the armature inner part can be manufactured by composite injection molding in a multi-component or multi-raw-material injection-molding method, e.g. a 2K method, in an injection molding machine. Two different materials can be processed to form the armature inner part at the same time, in order to a achieve a hard-soft connection. The armature inner part can thus be manufactured in one production step with the elastic elements injection-molded onto the two front sides. For the employed plastics to have sufficient mutual adhesion, in particular combinations promoting the adhesion between the two plastics can be used (cf. in this regard e.g. Christoph Jaroschek, chapter 4.5 "Mehrkomponentenspritzgießen" ["Multi-component injection mol ding" ] in "Spritzgießen für Praktiker" ["Injection molding for practitioners"], $2^{nd}$ edition, Hanser Verlag, Munich 2008, ISBN 978-3-446-40577-6, p. 115-133). Since the armature inlay is geometrically smaller in comparison to the overall armature, it necessitates less space in the vulcanizing tool, whereby the tool can be executed in a more compact manner.

BRIEF DESCRIPTION OF THE FIGURES

Further advantages, features and details of the invention will result from the following description, in which certain embodiments of the invention will be described in detail with reference to the drawings. The features mentioned in the claims and in the description may be essential to the invention individually per se or in any desired combination. Functionally similar or identical members or components are supplied in part with the same reference signs. The terms "left", "right", "top", "bottom" employed in the description of the exemplary embodiments relate to the drawings as oriented with the figure designations or reference numerals in the normally legible way. There are shown:

DETAILED DESCRIPTION

The following description will set forth numerous specific details of the present disclosure. However, it is understood that further embodiments are possible also without these specific details. Circuits, structures and methods known to the person skilled in the art will not be discussed in detail here, in order to avoid unnecessarily rendering understanding of the present description more difficult or to avoid overloading it. The terms "coupled" and "connected/plugged" and terms deviated therefrom are not used synonymously. In specific embodiments "connected/plugged" can indicate that two or more elements are in direct physical or electric contact with each other. "Coupled" can mean that two or more elements interact with or influence each other, wherein they can be in direct, but also indirect physical or electric contact with each other. Unless stated otherwise, the use of the ordinal adjectives "first", "second", "third" etc. to designate a common object merely indicates that reference is made to different examples of objects of the same type and is not intended to imply that the thus designated objects are or must occur in a certain temporal, spatial, ranking or other order.

Figure 2:
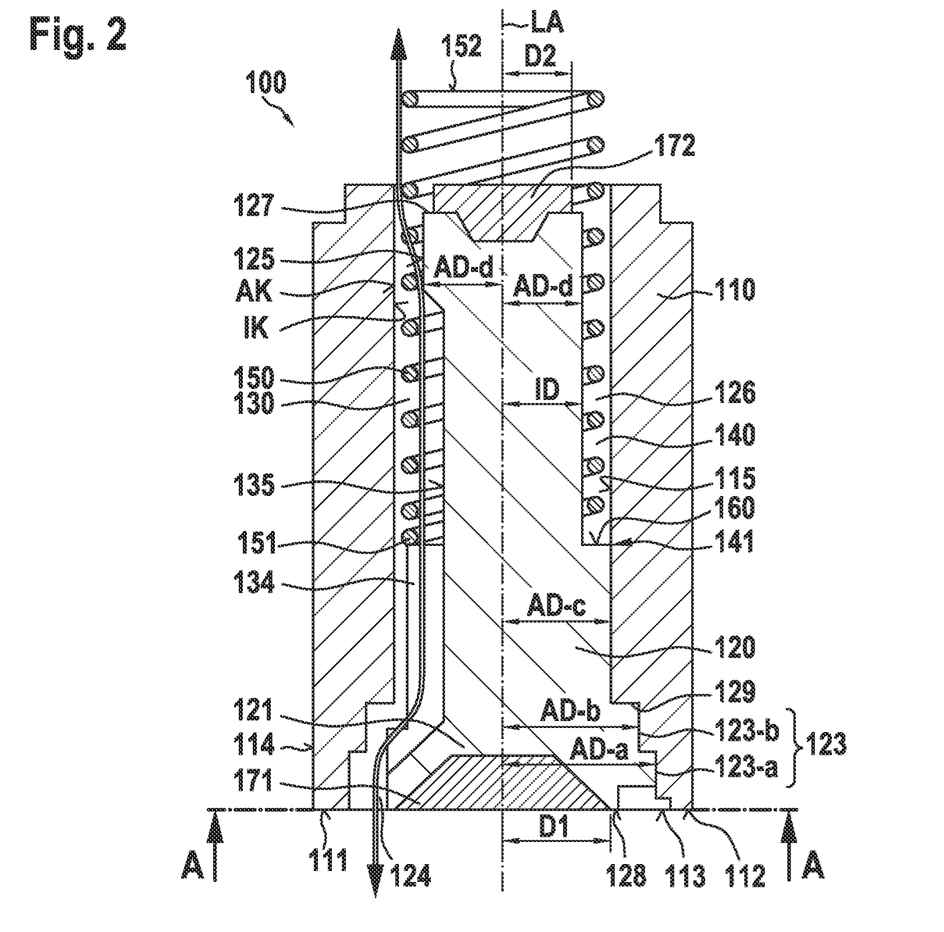
FIG. 2 a sectional representation of a multi-part armature assembly according to an embodiment.

FIG. 2 shows a sectional representation of a multi-part armature assembly 100 for an electromagnetically actuatable way valve according to an embodiment.

The armature assembly 100 substantially consists of a tube-shaped armature outer part 110 and an armature inner part 120 axially inserted in a mounting end 111 of the armature outer part 110. The armature assembly 100 defines a longitudinal axis LA.

Between the armature outer part 110 and the armature inner part 120 inserted therein at least one axial through flow duct 130 is formed. The through flow duct 130 extends axially through the armature assembly 100.

Further, between the armature outer part 110 and the armature inner part 120 inserted therein, a hollow cylinder-shaped recess 140 is formed coaxially, which is intended to receive and guide a cylindrical (pressure) spring 150. For this purpose, the recess 140 is open for receiving the spring 150 at the end 127 of the armature inner part 120 opposite the mounting end 111. On the inside of the recess 140, in the embodiment of FIG. 2, a shoulder is formed on the armature inner part 120, said shoulder forming, as the bottom 141 in the recess 140, a support 160 for the inner spring end 151 of the spring 150.

On one attachment end 121, the armature inner part 120 has a radially protruding edge 123 that extends in the circumferential direction orthogonally to the longitudinal axis LA. In the edge 123 a recess 124 is provided that corresponds to the at least one through flow duct 130. The protruding surface of the edge 123 that is directed toward the inside in the direction of the longitudinal axis LA with reference to the armature assembly functions as an end stop 129 for a complementary area of the armature outer part 110 on the inserted armature inner part 120, whereby an exact positioning of the armature inner part 120 in the armature outer part 110 is ensured.

The outer diameter of the edge 123 of the armature inner part 120 is executed to decrease over two steps 123-a and 123-b starting from the attachment end 121 in the direction of the longitudinal axis LA, so that the outer diameter of the edge 123 decreases first from AD-a to AD-b and then to AD-c. As noted elsewhere, the stepping of the edge 123 avoids stress and tensions in the material of the armature inner part during operation by avoiding great diameter changes.

It should be noted that in the figures respectively only the ½ diameters are drawn for the sake of simplification; i.e. correctly, the term radii should be used.

The armature outer part 110 as a hollow cylinder has a production-technically particularly simple shape. The tube-shaped armature outer part 110 has an inner contour IK that is complementary to the outer contour AK of a rotation body defined by rotating the armature inner part 120 around the longitudinal axis LA, which can be manufactured easily by a machining turning method.

The at least one axial through flow duct 130 is executed in the embodiment example in the form of an axial groove 134 in the outer surface 125 of the armature inner part 120. Of course, the geometry of the cross section of the through flow duct 130 can fundamentally be created as desired, wherein merely the requirements of the manufacturing method applied for the armature inner part 120 have to be taken into consideration.

The groove bottom 135, i.e. the bottom of the groove 134, when viewing a cross section through the armature inner part 120, wherein the cross section extends through the groove 134 and contains the longitudinal axis LA, at least along the longitudinal axis LA extends deeper in the armature inner part 120 than the inner diameter ID of the axial hollow cylinder-shaped recess 140 for retaining the cylindrical spring 150. An effective cross section of the groove 134 actually defining the through flow duct 130 therefore is disposed below the spring 150 when the spring 150 has been introduced.

The end 127 of the armature inner part 120 opposite the attachment end 121 has an outer diameter AD-d, which is substantially equal to the inner diameter ID of the axial hollow cylinder-shaped recess 140 for receiving the cylindrical spring 150.

The armature inner part 120 is permanently fastened in the armature outer part 110 by folding and/or bending and/or caulking the material of the armature outer part 110 in one or several places 113 in the front side 112 and/or at the edge 114 of the mounting end 111 of the armature outer part 110.

Figure 3:
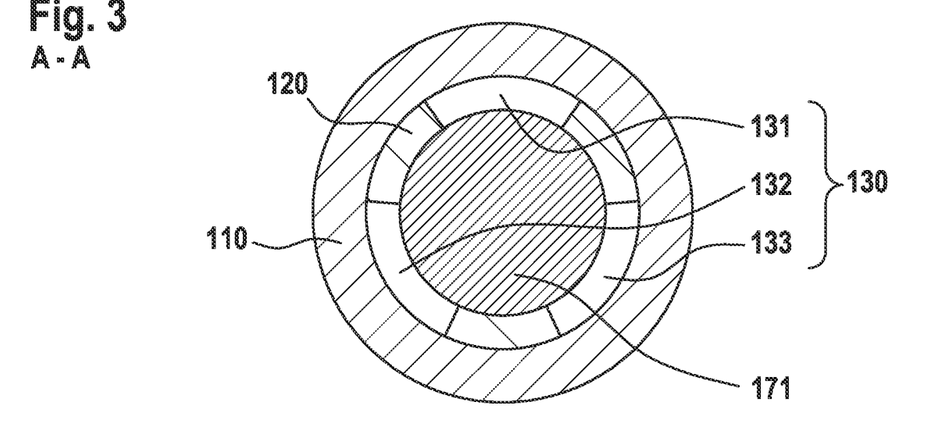
FIG. 3 a plan view of the lower end of the multi-part armature assembly of FIG. 2.

As can be recognized more easily on the basis of FIG. 3, the armature assembly 100 of the embodiment has several, namely three, through flow ducts 131, 132, 133. The three through flow ducts 131, 132, 133 are arranged over the circumference of the armature inner part 120 in evenly distributed manner with reference to the longitudinal axis of the armature inner part 120, by the through flow ducts 131, 132, 133 being defined in the form of ring cylinder sectors respectively over an angle range of 360°/(2n)=360°/6=60°, wherein n=3 is the number of the through flow ducts 131, 132, 133.

With regard to the materials for the armature outer part 110 and the armature inner part 120 the following should be noted.

The armature outer part 110 is executed from a magnetically soft material for the function of the armature assembly 100 as a magnetic armature. For this purpose, the material can be any one of the following, depending on demand and manufacturing method: Soft iron, steel with a low carbon proportion, steel with added silicon (FeSi), cobalt-iron alloys (FeCo), iron-aluminum alloys (e.g. FeAl, FeAlSi), ferrites or the like.

Since the armature inner part 120 does not have to be capable of conducting a magnetic flow, a material with a lower density than one of the above-stated magnetically soft materials can be selected. A hard plastic has proven suitable, such as high-density polyethylene, HDPE, polypropylene, PP, polymethyl methacrylate, PMMA, polyethylene terephthalate, PET, polyamide, PA, polycarbonate, PC, cellulose acetate, CS, and the like.

In the axial front sides 127, 128 of the armature inner part 120 there is respectively integrated in injection-molded or vulcanized manner, an elastic element 171, 172 as a seal and/or damper made of an elastic material. The shape of the elastic elements 171, 172 is respectively rotation-symmetric to the longitudinal axis LA of the armature inner part 120, wherein, with reference to the longitudinal axis LA of the armature inner part 120, the diameter D1, D2 of the elastic elements 171, 172 decreases respectively in the direction of the longitudinal axis LA toward the inside of the armature inner part 120. On the spring-side end 127 of the armature inner part 120 the elastic element 171 is shaped such that it projects beyond the material of the armature inner part 120.

As the material for the elastic elements 171, 172 an elastomer is particularly suitable since the elastic elements formed therewith are suitable both as a sealing element and as a damping element. As the material for the elastic elements 171, 172 there are suitable in particular acrylonitrile-butadiene-styrene copolymer, ABS, ethylene-propylene-dien rubber, EPDM, silicon, acrylonitrile-butadiene rubber, NBR or H-NBR, perfluoroelastomer, FFKM, fluororubber, FKM, polytetrafluoroethylene, PTFE, polyethylene, PE, polystyrene, PS, and the like.

Figure 4:
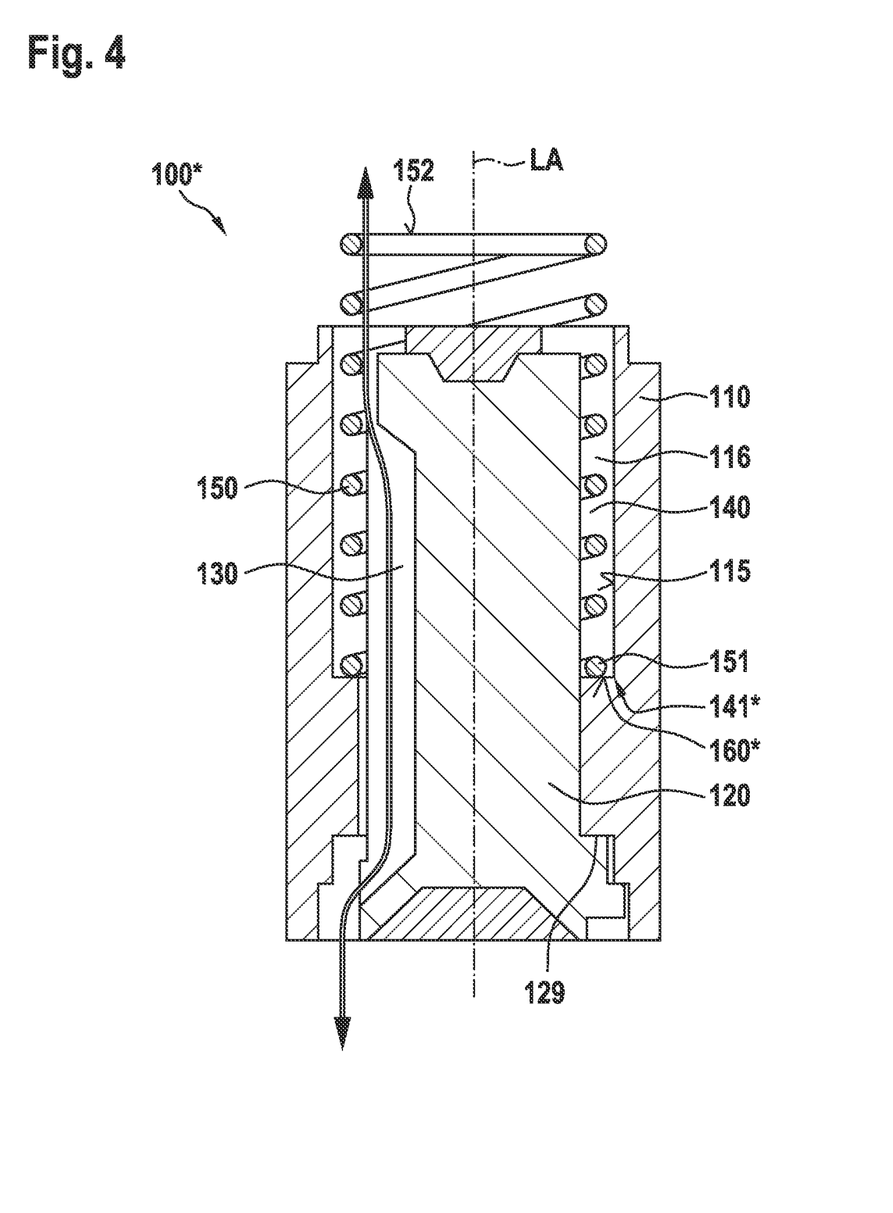
FIG. 4 a sectional representation of an alternative embodiment of the multi-part armature assembly according to the embodiment of FIG. 2.

FIG. 4 shows a sectional representation of an alternative embodiment of the multi-part armature assembly of the embodiment of FIG. 2. The armature assembly 100\* of FIG. 4 is substantially identical to that of FIG. 2 with one exception, which relates to an alternative support 160\* for the spring 150.

In the armature assembly 100\* of FIG. 4 there is likewise coaxially formed a hollow cylinder-shaped recess 140 between the armature outer part 110 and the armature inner part 120 inserted therein, said recess being intended to receive and guide the cylindrical (pressure) spring 150 and likewise being open at the end 127 of the armature inner part 120 opposite the mounting end 111 for retaining the spring 150. On the inside of the recess 140 a shoulder is formed on the armature outer part 110 in the embodiment of FIG. 4, said shoulder forming the support 160\* for the inner spring end 151 of the spring 150 as the bottom 141\* of the recess 140.

In the valve device of the present disclosure described below in connection with FIGS. 5 and 6 the multi-part armature assembly 100 (FIGS. 2 and 3) or 100\* (FIG. 4) is respectively used in an electromagnetically actuatable valve device 200 (FIG. 5) with two connectors or a valve device 200\* (FIG. 6) with three connectors and respectively two switching positions. It is applicable to each of the valve devices described below that, as soon as the coil of the magnetic valve is energized, a magnetic field is built up in the coil, which leads to a force that minimizes the air gap between the armature assembly 100 and a pole part and thereby the minimizes the magnetic resistance in the axial direction of the armature assembly. A cylindrical pressure spring, which is arranged in a biased state between the pole part and the armature assembly, upon switching off the electric current through the coil, effects that the armature assembly is returned to the basic position as soon as the magnetic field diminishes. This controllable movement of the armature assembly results in a sealing or in a release of a ring gap on a valve of the valve device and thus in a corresponding through flow between the respective valve seat of the valve and the sealing elastic element of the armature assembly.

Figure 5:
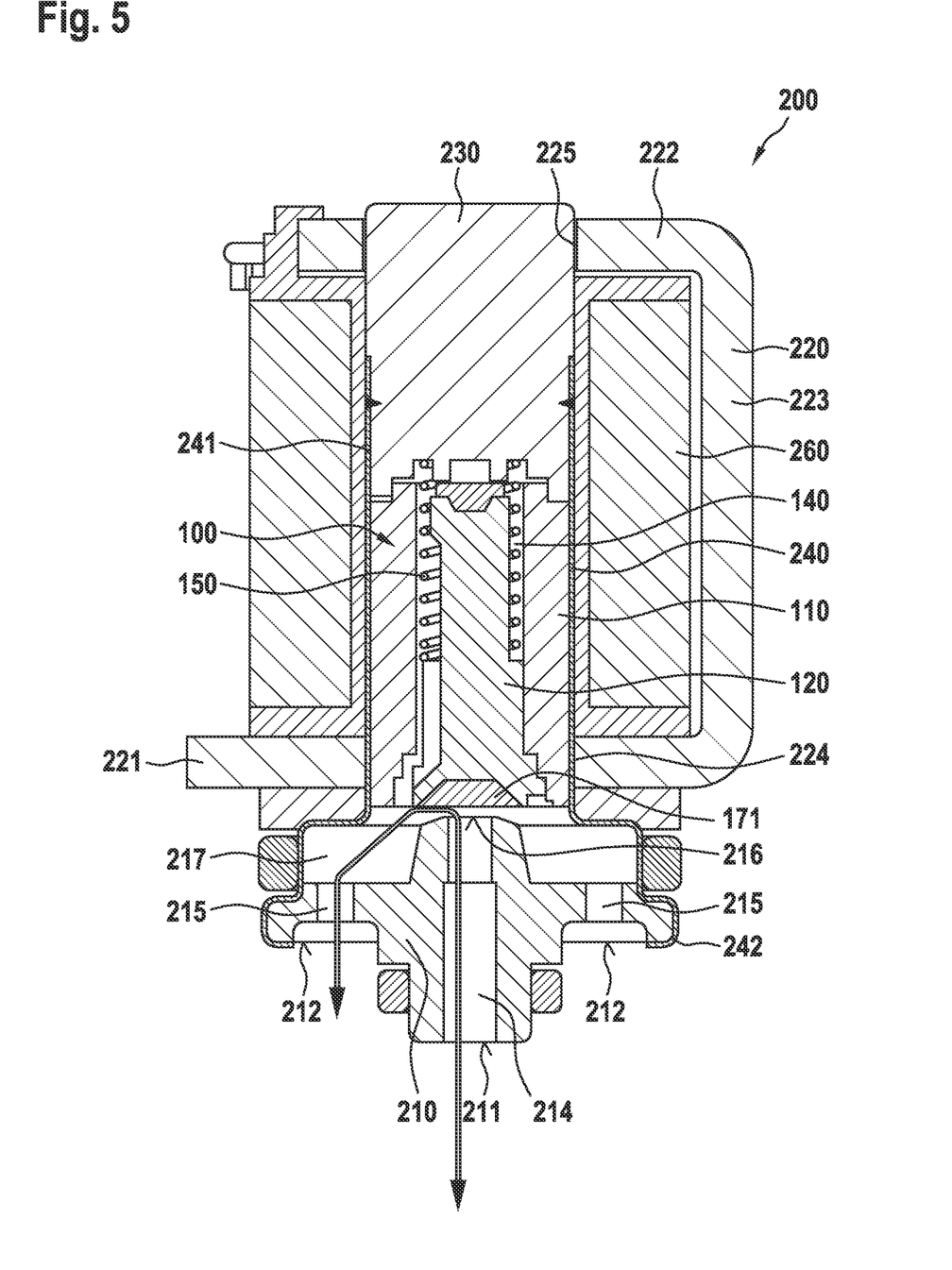
FIG. 5 a lateral sectional view of a first embodiment of a valve device with the multi-part armature assembly of FIGS. 2 and 3 executed as an NC 2/2 way valve.

FIG. 5 shows a lateral sectional representation of the first embodiment example of a valve device with the multi-part armature assembly of FIGS. 2 and 3 embodied as a NC 2/2 way valve. The way valve device 200 shown by way of example substantially has the known components of conventional electromagnetically actuated valve device.

An electromagnet assembly consisting of an electrically energizable wire winding as the coil 260 for producing a magnetic field and an associated magnetic flow through a yoke 220, which girts the coil 260 in a U-shape, on the front sides respectively with a yoke front part 221, 222 and in the longitudinal direction with a yoke longitudinal part 223 connecting the yoke front parts 221, 222. The magnetic circuit of the electromagnet assembly is completed by a guide tube 240, which is closed in pressurizing medium-tight manner at an end 241 with a cylinder-shaped pole part 230, for example by welding, and inserted in a receiving space defined by correspondingly shaped recesses 224, 226 in the yoke front parts 221, 222, which are oriented coaxially to a cylinder-shaped interior space defined by the coil 260.

The armature assembly 100 of FIGS. 2 and 3 proposed here is inserted in the guide tube 240 together with a spring 150 introduced in the hollow cylinder-shaped recess 140 of the armature assembly 100 and supported on the pole part 230 on the inside of the guide tube 240. The armature assembly 100 is thus movably arranged in the guide tube 240, wherein the spring 150 effects a basic position or resting position of the armature assembly.

A nozzle part 210 has a central first pressurizing medium connector 211 arranged coaxially to the guide tube 240, and a decentralized second pressurizing medium connector 212, wherein the first pressurizing medium connector 211 is connected to a first pressurizing medium duct 214 extending coaxially to the guide tube 240, and the second pressurizing medium connector 212 is connected to a second pressurizing medium duct 215.

An end of the first pressurizing medium duct 214 arranged on the inside of the guide tube 240 forms a first valve seat 216 and a first valve together with the first elastic element 171 as a sealing element caused to abut there by the spring 150.

The nozzle part 210 is attached in the guide tube 240 at the other end 242 opposite the pole part 230, in the embodiment shown by folding or bending the edge at the end of the guide tube 240 widened there, in such a manner that the folded edge undercuts the nozzle part 210, thereby permanently attaching it. Together with the guide tube 240, the inserted nozzle part 210 defines a valve chamber 217, which is connected to the second pressurizing medium duct 215.

In line with the working principle described above, through energizing the coil 260, the first pressurizing medium duct 214 and the second pressurizing medium duct 215 can be interconnected via the first valve by means of a movement of the armature assembly 100 in the guide tube 240 against the action of the spring 150. In the basic position the first pressurizing medium duct 214 and the second pressurizing medium duct 215 are mutually locked due to the closed first valve.

Figure 6:
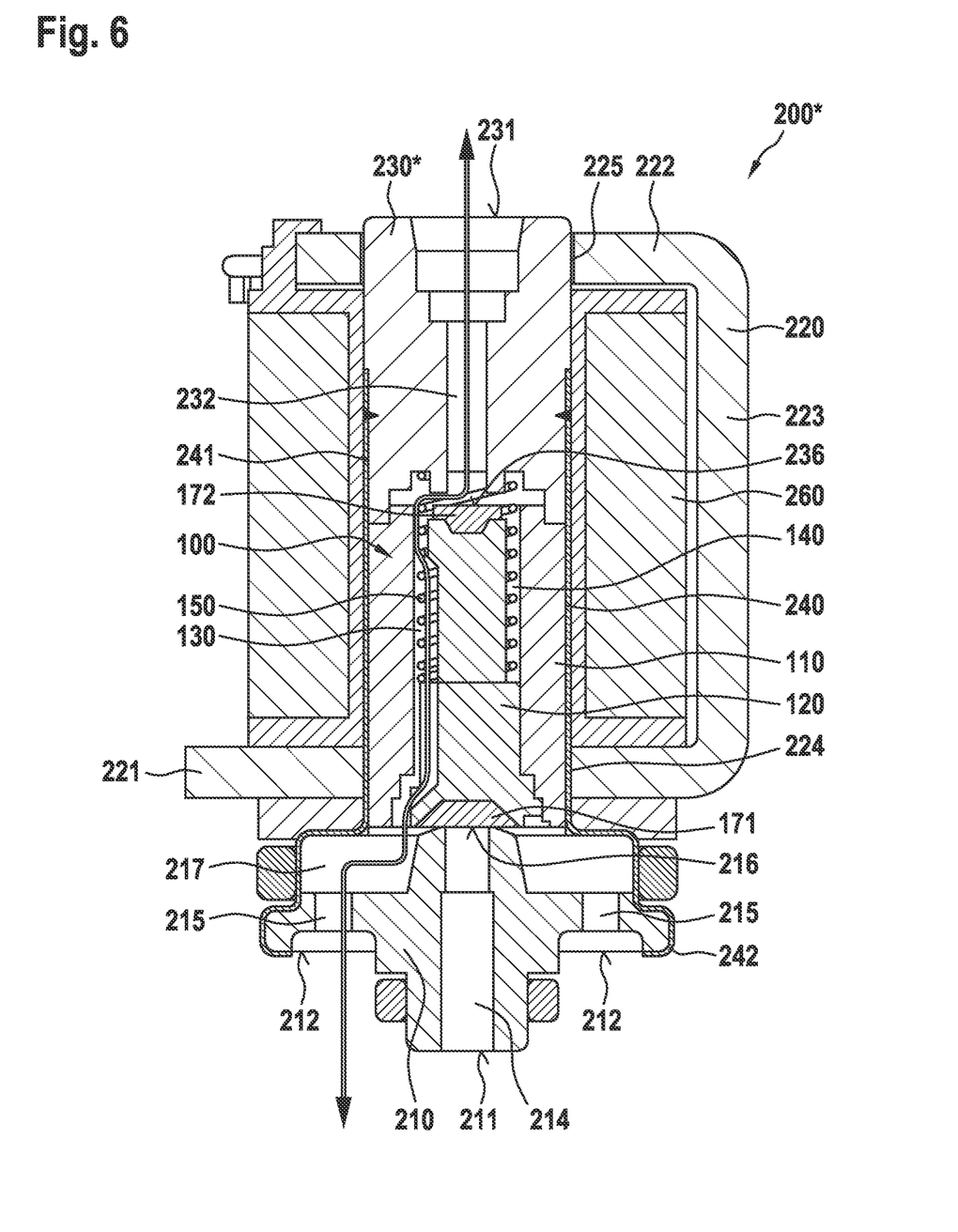
FIG. 6 a lateral sectional view of a second embodiment of a valve device with the multi-part armature assembly of FIGS. 2 and 3 executed as an NC 3/2 way valve.

FIG. 6 shows a lateral sectional representation of a second embodiment as a variant formation of the valve device 200 of FIG. 5, likewise with the multi-part armature assembly 100 of FIGS. 2 and 3, embodied as an NC 3/2 way valve. For this purpose, the valve device 200\* of FIG. 6 is substantially identical to the valve device 200 of FIG. 5 by the exception of the pole part 230\*.

The pole part 230\* is a development of the pole part 230 of FIG. 5. The pole part 230\* is executed with a further, i.e. third, pressurizing medium connector 231 and a third pressurizing medium duct 232 connected thereto and extending coaxially to the guide tube 240. The end of the third pressurizing medium duct 232 arranged on the inside of the guide tube 240 forms a second valve seat and a second valve with the second elastic element 172 of the armature assembly 100 that can be caused to abut there.

The second pressurizing medium duct 215 and the third pressurizing medium duct 232 are interconnected in the resting position via the second valve by means of a movement of the armature assembly 100 in the guide tube 240 through the spring 150. In the basic position of the valve device 200* the second valve and thus the third pressurizing medium duct 232 is open, and the first valve and thus the first pressurizing medium duct 214 is closed. This state of the valve device 200* is shown in FIG. 6.

Through energizing the coil, the armature assembly 100 can be moved in the guide tube 240 against the spring 150, whereby the second valve and thus the third pressurizing medium duct 232 are locked and the first valve and the first pressurizing medium duct 214 are opened. In this state the first pressurizing medium duct 214 and the second pressurizing medium duct 215 are interconnected via the valve chamber 217. This state of the valve device 200* is not shown in FIG. 6, but in principle corresponds to the state in which the valve device is shown in FIG. 5.

Figure 7:
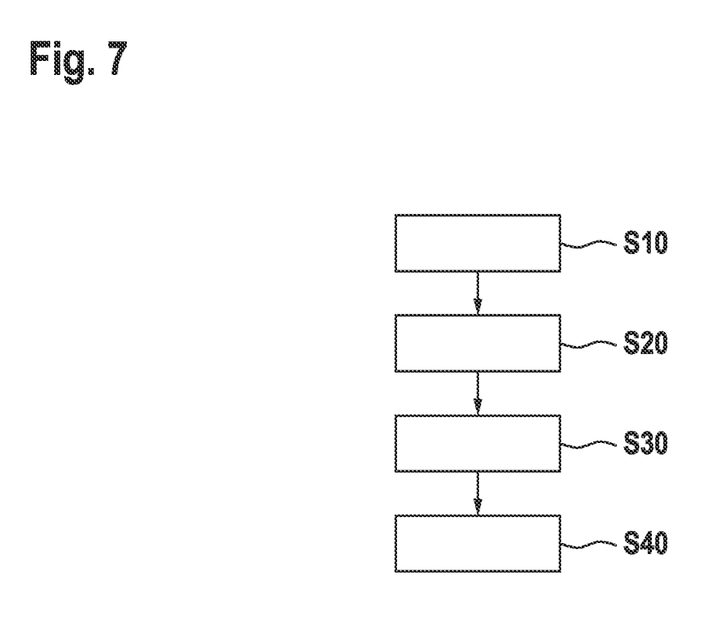
FIG. 7 a flow chart for illustrating a manufacturing method for the armature assembly according to the embodiment of FIG. 2 or FIG. 4.

FIG. 7 is a flow chart to illustrate a manufacturing method for the armature assembly according to the embodiment of FIG. 2 or of FIG. 4. It should be pointed out that, in order to avoid repetitions, in the following not all details relating to the manufacture of the armature assembly will be repeated again and it is clear that the already described aspects of manufacture are fully compatible with the following minimal description of the manufacturing method and are thus deemed disclosed also in combination with the manufacturing method. The manufacturing method for the armature assembly 100 or 100* for an electromagnetically actuatable 2/2 or 3/2 way valve has the following steps:

A step S10 with manufacturing the tube-shaped armature outer part 110 from a ferromagnetic material. For example, the tube-shaped armature outer part 110 can be turned from a solid material or an already tube-shaped start part can be processed to become the armature outer part 110 by turning to gauge.

A step S20 with manufacturing the armature inner part 120 from a material with a lower density than the ferromagnetic material. The armature inner part 120 can be manufactured, for example, by injection molding, preferably a multi-component injection-molding method, for example a 2K method.

The steps S10 and S20 can take place in a desired order.

The steps S10 and S20 are followed by a step S30 with inserting the armature inner part 120 into the mounting end 111 of the armature outer part 110.

The steps S10 and S20 interact to the extent that—as can be recognized in FIGS. 2 and 4—a rotation-symmetric inner contour IK of the armature outer part 110 and the armature inner part 120 are created during manufacture in such a manner that by the insertion step S30 there are formed at least one axial through flow duct 130 through or in the armature assembly 100 between the armature outer part 110 and the inserted armature inner part 120, and an axial hollow cylinder-shaped recess 140 for receiving a cylindrical spring 150. Depending on the embodiment of FIG. 2 or of FIG. 4, a bottom 141 of the recess 140, which is intended to later act as a support 160 for a spring end 151 arranged on the inside, is formed by the armature inner part 110 and/or the armature outer part 120.

Subsequent to the step S30, there follows a step S40 for the permanent attachment of the inserted armature inner part 120 in the armature outer part 110. This can take place by at least one of folding, bending and caulking of the material of the armature outer part 110 in one or several places 113 in the front side 112 and/or at the edge 114 of the mounting end 111 of the armature outer part 110.

The invention claimed is:

1. An armature assembly for an electromagnetically actuatable way valve with a tube-shaped armature outer part of a ferromagnetic material with a longitudinal axis and an armature inner part from a material with a lower density than the ferromagnetic material, said armature inner part being axially inserted in a mounting end of the armature outer part, wherein between the armature outer part and the armature inner part there is formed at least one through flow duct through the armature assembly, and a hollow cylinder-shaped recess is formed coaxially, wherein the recess is open at the end of the armature inner part opposite the mounting end for retaining a cylindrical spring and from the armature inner part and/or the armature outer part a bottom of the recess is formed as a support for an inner spring end of the spring.

2. The armature assembly according to claim 1, wherein
    the armature inner part has at one attachment end a radially protruding edge that extends in the circumferential direction orthogonally to the longitudinal axis, in which recesses corresponding to the at least one through flow duct are provided; and
    the tube-shaped armature outer part has an inner contour complementary to the outer contour of a rotation body defined by rotation of the armature inner part around the longitudinal axis.

3. The armature assembly according to claim 1, wherein
    the outer diameter of the armature inner part decreases starting from the attachment end in the direction of the longitudinal axis, and
    the decrease of the outer diameter extends in stepped manner or linearly or in a combination of both.

4. The armature assembly according to claim 1, wherein the at least one axial through flow duct is defined in the form of an axial groove in the outer surface of the armature inner part, wherein a groove bottom in cross section through the groove and the longitudinal axis of the armature inner part, is disposed at least partly deeper in the armature inner part than the inner diameter of the axial hollow cylinder-shaped recess for receiving the cylindrical spring, and/or wherein the end of the armature inner part opposite the attachment end has an outer diameter which is substantially smaller than or equal to the inner diameter of the axial hollow cylinder-shaped recess for receiving the cylindrical spring.

5. The armature assembly according to claim 1,
    wherein the armature inner part is fastened by at least one of folding, bending and caulking of the material of the armature outer part in one or several places in the front side and/or at the edge of the mounting end of the armature outer part.

6. The armature assembly according to claim 1,
    wherein the support for the spring is formed by:
    a ring cylindrical recess extending coaxially to the longitudinal axis of the armature outer part in the inner surface of the armature outer part; and/or
    a cylindrical recess extending coaxially to the longitudinal axis of the armature inner part in the outer surface of the armature inner part.

7. The armature assembly according to claim 1, wherein several through flow ducts are configured in the armature assembly, and wherein the several through flow ducts are arranged in evenly distributed manner over the circumference of the armature inner part with reference to the longitudinal axis of the armature inner part; and wherein the through flow ducts are defined in the form of ring cylinder sectors over an angle range of 360°/(2n), wherein n is the number of through flow ducts.

8. The armature assembly according to claim 1, wherein the armature outer part consists of a magnetically soft material, which is selected from the group consisting of: soft iron, steel with a low carbon proportion, steel with added silicon (FeSi), nickel-iron alloys (FeNi), cobalt-iron alloys (FeCo), iron-aluminum alloys (e.g. FeAl, FeAlSi), and ferrites, and/or wherein the armature inner part consists of a hard plastic, which is selected from the group consisting of: high-density polyethylene, HDPE, polypropylene, PP, polymethyl methacrylate, PMMA, polyethylene terephthalate, PET, polyamide, PA, polycarbonate, PC, cellulose acetate, and CS.

9. The armature assembly according to claim 1,
wherein in the axial front sides of the armature inner part there is integrated by injection-molding or vulcanizing respectively an elastic element as a seal and/or damper of an elastic material.

10. The armature assembly according to claim 9,
wherein the shape of the elastic elements is rotation-symmetric respectively to the longitudinal axis of the armature inner part and the diameter of the elastic elements, with reference to the longitudinal axis of the armature inner part, becomes smaller respectively in the direction of the longitudinal axis toward the inside of the armature inner part, and/or
wherein at least one of the elastic elements projects beyond the material of the armature inner part at the associated end of the armature inner part.

11. The armature assembly according to claim 9,
wherein the elastic elements consist of an elastomer, which is selected from the group consisting of: acrylonitrile-butadiene-styrene copolymer, ABS, acrylonitrile-butadiene-styrene rubber, EPDM, silicon, acrylonitrile-butadiene rubber, NBR or H-NBR, perfluoroelastomer, FFKM, fluororubber, FKM, polytetrafluoroethylene, PTFE, polyethylene, PE, polystyrene, PS, and the like.

12. An electromagnetically actuatable way valve device with an armature assembly according to claim 1 as an actuation element for actuating the valve.

13. The electromagnetically actuatable way valve device according to claim 12, further comprising: an electromagnet assembly consisting of an electrically energizable coil, a yoke which girts the coil on the front side respectively with a yoke front part and in the longitudinal direction with a yoke longitudinal part connecting the yoke front parts; a guide tube into which the armature assembly is inserted; a pole part, which is attached at one end of the guide tube in a pressurizing medium-tight manner; a spring introduced in the recess of the armature assembly and supported on the pole part on the inside of the guide tube; and a nozzle part with a first pressurizing medium connector and a second pressurizing medium connector, wherein the first pressurizing medium connector is connected to a first pressurizing medium duct extending coaxially to the guide tube and the second pressurizing medium connector is connected to a second pressurizing medium duct; wherein an end of the first pressurizing medium duct arranged on the inside of the guide tube forms a first valve seat and a first valve together with the first sealing element of the armature assembly caused to abut there by the spring; wherein the nozzle part is attached at the other end opposite the pole part, and, together with the guide tube, defines a valve chamber, which is connected to the second pressurizing medium duct, wherein recesses in the yoke front parts are oriented coaxially to an interior space defined by the coil and thus define a receiving space into which the pole part connected to the guide tube is inserted, and wherein the first pressurizing medium duct and the second pressurizing medium duct can be selectively interconnected or mutually locked via the first valve by means of a movement of the armature assembly in the guide tube through energizing the coil.

14. The electromagnetically actuatable way valve device according to claim 13, wherein
the pole part has a third pressurizing medium connector and, connected thereto and extending coaxially to the guide tube, a third pressurizing medium duct, the end of which, arranged on the inside of the guide tube, forms a second valve seat and a second valve with the second sealing element of the armature assembly which can be caused to abut there, and
wherein the third pressurizing medium duct can be locked via the second valve by means of a movement of the armature assembly in the guide tube through energizing the coil.

15. A manufacturing method for an armature assembly, for an electromagnetically actuatable 2/2 or 3/2 way valve according to claim 1, comprising the following steps of:
a) (S10) manufacturing the tube-shaped armature outer part from a ferromagnetic material;
b) (S20) manufacturing the armature inner part from a material with a lower density than the ferromagnetic material;
c) (S30) inserting the armature inner part into the mounting end of the armature outer part;
d) (S40) fastening the inserted armature inner part by at least one of folding, bending and caulking the material of the armature outer part in one or several places in the front side and/or at the edge of the mounting end of the armature outer part;
wherein a rotation-symmetric inner contour of the armature outer part and the armature inner part are configured such during manufacture that by the insertion step c) between the armature outer part and the inserted armature inner part there are formed at least one axial through flow duct through the armature assembly and an axial hollow cylinder-shaped recess for retaining a cylindrical spring, wherein further a bottom of the recess is formed by the armature inner part and/or the armature outer part as a support for an end of a spring.

\* \* \* \* \*